United States Patent
Venetianer et al.

(10) Patent No.: US 9,729,782 B2
(45) Date of Patent: Aug. 8, 2017

(54) SYSTEM AND METHOD FOR INTELLIGENT CAMERA CONTROL

(71) Applicant: Digital Signal Corporation, Chantilly, VA (US)

(72) Inventors: Péter L. Venetianer, McLean, VA (US); Randall J. St. Romain, II, Clifton, VA (US); Miraj Shah, Fairfax, VA (US); Chris Roller, Fairfax, VA (US)

(73) Assignee: Digital Signal Corporation, Chantilly, VA (US)

( * ) Notice: Subject to any disclaimer, the term of this patent is extended or adjusted under 35 U.S.C. 154(b) by 215 days.

(21) Appl. No.: 14/732,657

(22) Filed: Jun. 5, 2015

(65) Prior Publication Data
US 2016/0360101 A1    Dec. 8, 2016

(51) Int. Cl.
| | | |
|---|---|---|
| *H04N 13/02* | (2006.01) | |
| *G06K 9/68* | (2006.01) | |
| *H04N 5/232* | (2006.01) | |
| *H04N 5/235* | (2006.01) | |
| *H04N 5/243* | (2006.01) | |
| *H04N 5/238* | (2006.01) | |

(52) U.S. Cl.
CPC ......... *H04N 5/23219* (2013.01); *H04N 5/238* (2013.01); *H04N 5/2353* (2013.01); *H04N 5/243* (2013.01)

(58) Field of Classification Search
CPC .. H04N 5/23219; H04N 5/243; H04N 5/2353; H04N 5/238
See application file for complete search history.

(56) References Cited

U.S. PATENT DOCUMENTS

| | | | | |
|---|---|---|---|---|
| 8,121,404 B2* | 2/2012 | Xiao | ...................... | G03B 7/091 348/229.1 |
| 9,210,319 B2* | 12/2015 | Rav-Acha | .......... | H04N 5/23219 |
| 9,436,870 B1* | 9/2016 | Mangiat | ............. | G06K 9/00221 |
| 2012/0201426 A1* | 8/2012 | Jasinski | ............... | H04N 5/2351 382/107 |

(Continued)

*Primary Examiner* — Tsion B Owens
(74) *Attorney, Agent, or Firm* — Toering Patents PLLC

(57) ABSTRACT

Systems and methods for controlling camera settings of a camera to improve detection of faces in an uncontrolled environment are described. A first image is received from the camera, where the first image is captured by the camera at a first set of camera settings. A face is detected in the first image. The camera is adjusted to a second set of camera settings based on the detected face, where the second set of camera settings different from the first set of camera settings. A second image is received from the camera, where the second image is captured by the camera at the second set of camera settings. The face is detected in the second image. A quality metric of the face in the second image is determined where the quality metric is indicative of an image quality of the face in the second image. The camera is adjusted to a new set of camera settings to increase the quality metric of the face in subsequent images, the new set of camera settings different from both the first set of camera settings and the second set of camera settings. Once a sufficient quality metric of the face is achieved, the face is acquired, or otherwise captured, by the camera or other sensors.

17 Claims, 3 Drawing Sheets

(56) References Cited

U.S. PATENT DOCUMENTS

2014/0086486 A1\* 3/2014 Pillman .................. G06T 5/003
  382/173
2014/0307117 A1\* 10/2014 Feng .................... H04N 5/2351
  348/218.1

\* cited by examiner

SYSTEM AND METHOD FOR INTELLIGENT CAMERA CONTROL

FIELD OF THE INVENTION

The invention is generally related to various settings of a video camera and more particularly, to controlling such settings to improve detection and recognition of potential targets in an uncontrolled environment.

BACKGROUND OF THE INVENTION

Cameras, such as, but not limited to, consumer cameras (including video cameras), cell-phone cameras, and other conventional cameras employ certain camera settings designed to achieve some overall image quality. These camera settings, which may include aperture, gain, exposure, and other camera settings, have a significant influence on a quality of images acquired by a camera as well as subsequent processing of those images, for example, facial recognition, etc.

In some instances, conventional cameras employ face detection to assist the camera in adjusting these camera settings. However, these conventional cameras may sacrifice, for example, an exposure of a background (e.g., either underexposure or overexposure of the background) in favor of an exposure of the detected face. Such underexposure or overexposure of the background may result in the conventional camera failing to detect other faces in a scene. In addition, even if multiple faces are detected in the scene, such conventional cameras may have difficulty determining which detected face to use for adjusting the camera settings or difficulty generating camera settings sufficient for all faces.

The camera settings impact a quality of images acquired by the camera, which in turn, impact a performance of any subsequent image processing performed on the acquired images. Such image processing may include face detection, face recognition, or other computer vision algorithms. In some instances, a "quality" of the acquired images for purposes of face detection (or other image processing such as facial recognition) may differ from a "quality" of the acquired images for purposes of aesthetics (i.e., human perception of "image quality").

What is needed is an improved system and method for intelligent camera control that enhances performance of subsequent image processing on acquired images.

SUMMARY OF THE INVENTION

Various implementations of the invention relate to systems and methods for intelligent camera control that enhances performance of subsequent image processing on images acquired from a camera. In some implementations of the invention, a first image is received from the camera, where the first image is captured by the camera at a first set of camera settings. A face is detected in the first image. In some implementations of the invention, the camera is adjusted to a second set of camera settings based on the detected face, where the second set of camera settings is different from the first set of camera settings. In some implementations of the invention, a second image is received from the camera, where the second image is captured by the camera at the second set of camera settings. The face is detected in the second image. In some implementations of the invention, a quality metric of the face in the second image is determined where the quality metric is indicative of an image quality of the face in the second image. In some implementations of the invention, the camera is adjusted to a new set of camera settings to increase the quality metric of the face in subsequent images, the new set of camera settings different from both the first set of camera settings and the second set of camera settings. In some implementations of the invention, once a sufficient quality metric of the face is achieved, the face is acquired, or otherwise captured, by the camera or other sensors.

These implementations, their features and other aspects of the invention are described in further detail below.

DETAILED DESCRIPTION

Figure 1:
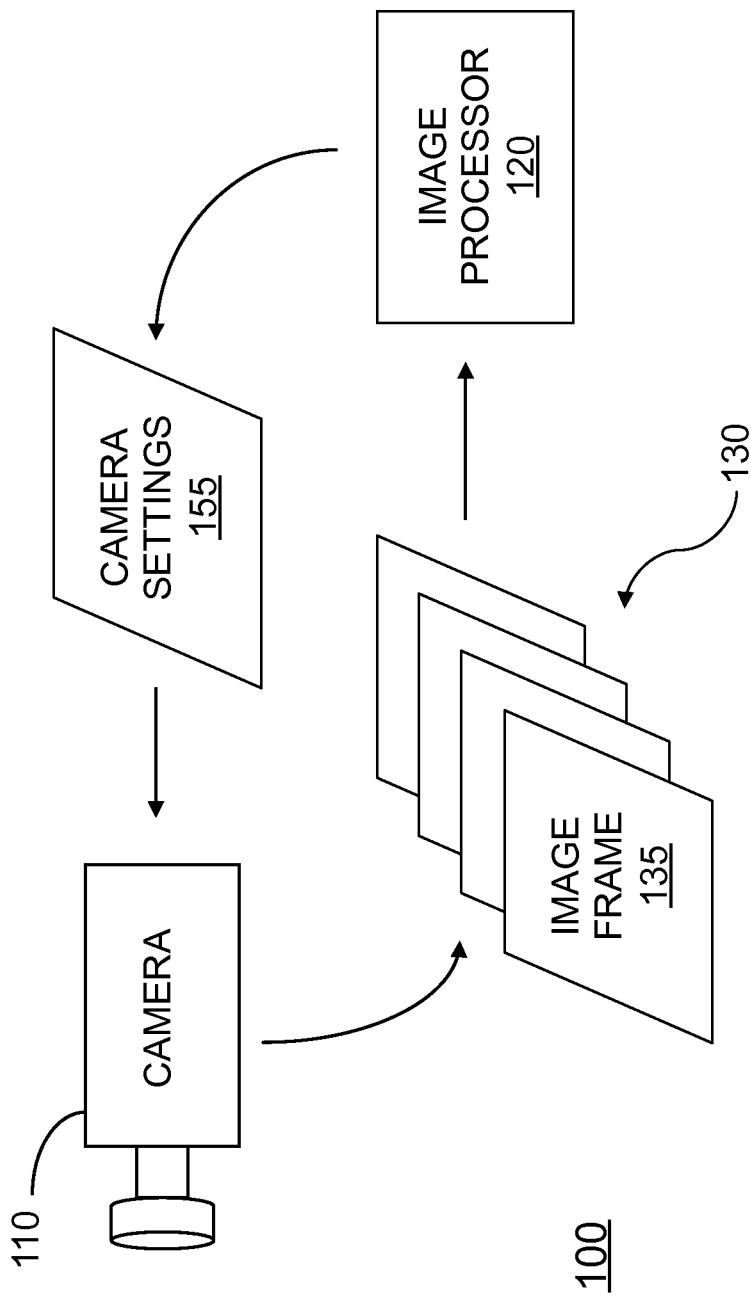
FIG. 1 illustrates an image processing system according to various implementations of the invention.

Detecting a target (e.g., a person or other target) or features of a target (e.g., a face of a person or other feature) in an uncontrolled environment is challenging, especially in an uncontrolled outdoor environment. First, the target is free to move into, out of, and within a field of view of the camera, at a variety of ranges and any number of other motion factors as would be appreciated. Second, illumination of the target differs by weather, time of day, orientation of the target, objects in the environment, and any number of other illumination factors as would be appreciated. Third, illumination of various regions of the target (e.g., a face) may dramatically differ from other regions of the target or other areas in the field of view. Fourth, having the target inside a vehicle dramatically increases the challenges by introducing vehicle type, vehicle motion, location of the target in the vehicle, window tinting, reflections, sunroofs, interior lighting, and any number of other vehicle factors as would be appreciated. Other factors provide further challenges to detecting faces in the uncontrolled environment. Developing a set of camera settings to provide an overall target for image quality is challenging.

According to various implementations of the invention, a set of camera settings is adjusted (i.e., changed from a first set of camera settings to a second set of camera settings) based on a probability of successfully recognizing a face of a target in an uncontrolled environment. According to various implementations of the invention, a set of camera settings is adjusted based on a probability of successfully detecting a face of a target in the uncontrolled environment, and then the set of camera settings is adjusted again based on a probability of successfully recognizing the detected face of the target. In some implementations of the invention, this may be accomplished by determining a quality metric for the image, and more particularly, for the detected face in the image. According to various implementations of the invention, a set of camera settings is adjusted once a windshield (or other window) is detected in the uncontrolled environment; then the set of camera settings is adjusted again based on a probability of successfully detecting a face of a target behind the windshield; and then the set of camera settings is adjusted again based on a probability of successfully recognizing the face of the target behind the windshield. In various ones of the foregoing implementations of the invention, once a certain quality metric for the image is achieved, the face is acquired, by, for example, a lidar system configured to generate a three-dimensional image of the face.

More generally speaking, according to various implementations of the invention, a set of camera settings may be adjusted once some event occurs (e.g., a detection of some aspect of the image, etc.); and then the set of camera settings may be adjusted again based on the occurrence of some other, and in some cases independent, event occurs (e.g., a detection of some other aspect of the image, etc.). As above, this adjusting may be iterated any number of times based on the same detection or different detections until some result is achieved. By way of example, but not of limitation, a vehicle may be detected in an image, and the set of camera settings adjusted to improve detection, for example, a license plate. Then, once a license plate is detected, the set of camera settings may be adjusted to improve recognition of characters on the license plates. At any point in this process, the set of camera settings may be adjusted, iteratively adjusted, or continuously adjusted until some result is achieved, which in the example of the license plate, a high resolution, high contrast image of the license plate sufficient to read the characters, either by person or machine.

FIG. 1 illustrates an image processing system 100 according to various implementations of the invention. Image processing system 100 includes a camera 110 and an image processor 120. In some implementations of the invention, camera 110 includes a video camera. In some implementations of the invention, camera 110 includes a digital camera. In some implementations of the invention, camera 110 includes a digital video camera. Camera 110 captures and outputs, to image processor 120, an image stream 130 comprised of a series of image frames 135 (also referred to herein as images 135). Some of these image frames 135 may include a target, or a face of the target (not otherwise illustrated) as would be appreciated.

In some implementations of the invention, camera 110 includes a video camera that provides a plurality of images 135 of the target that works in combination with a lidar system that provides a range measurement and/or a Doppler velocity measurement for each of a plurality of points on the target (or its face). Such a combined video camera and lidar system is available from Digital Signal Corporation, Chantilly, Va. and described in U.S. Pat. No. 8,717,545 to Sebastian et al., which is incorporated herein by reference in its entirety.

In some implementations of the invention, image processor 120 may comprise various hardware, software, firmware and/or any combination thereof that may be configured to perform various functions, including the functions described herein, as would be appreciated. Once so configured, image processor 120 becomes a particular machine configured to implement various features and aspects of the invention as would be appreciated. In some implementations of the invention, image processor 120 includes a computing processor and a memory (not otherwise illustrated), where the memory is configured to store instructions that, when executed by the computing processor, implement and/or perform various features and aspects of the invention, again, as would be appreciated.

Figure 2:
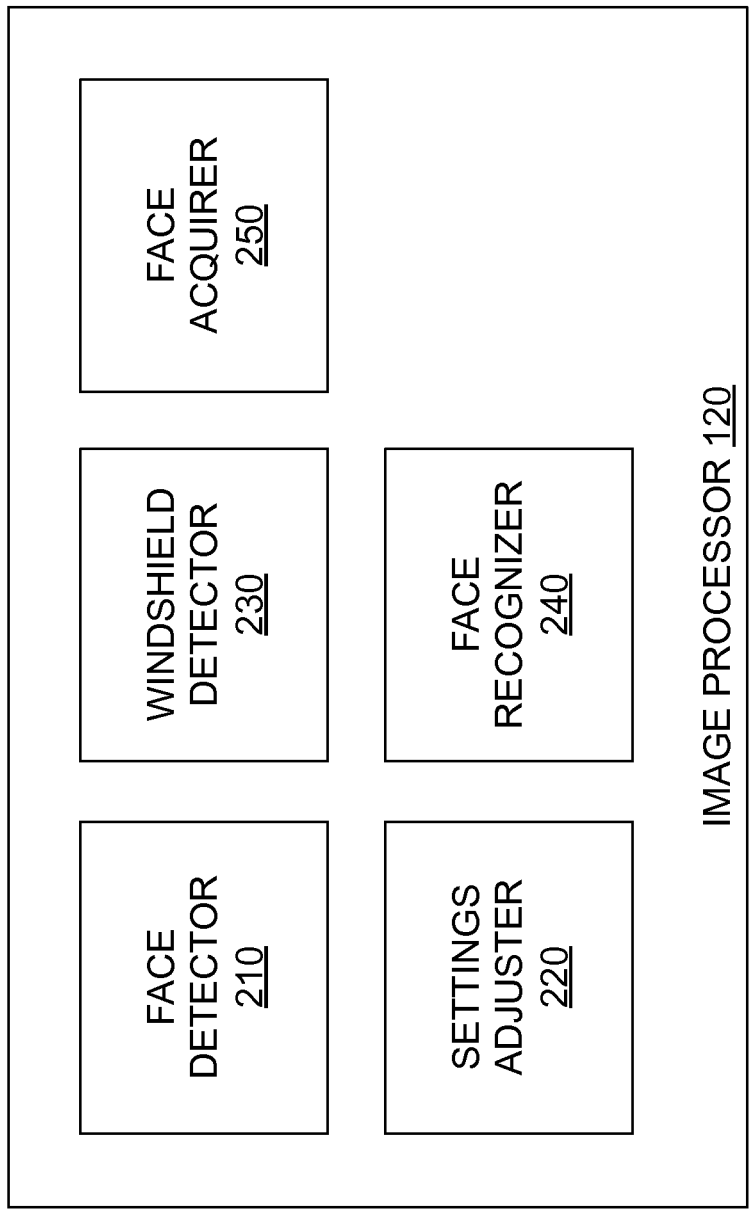
FIG. 2 illustrates various components of an image processor according to various implementations of the invention.

FIG. 2 illustrates image processor 120 according to various implementations of the invention. In some implementations of the invention, image processor 120 includes a face detector 210, a settings adjuster 220, a face recognizer 240, and a face acquirer 250. In some implementations of the invention, image processor 120 includes face detector 210, settings adjuster 220, a windshield detector 230, face recognizer 240, and face acquirer 250.

Face detector 210 receives image 135 and detects a face in image 135 in accordance with various known techniques for detecting faces in images of uncontrolled environments. In some implementations of the invention, face detector 210 outputs confirmation of a presence of a face in image 135. In some implementations of the invention, face detector 210 outputs a relative location of the face in image 135. In some implementations of the invention, face detector 210 outputs a relative location and an extent of the face in image 135.

In some implementations of the invention, based on the presence, location, and/or extent of the face in image 135, settings adjuster 220 adjusts various camera settings 155 of camera 110. These camera settings 155 may include an aperture of camera 110, an exposure time of camera 110, a gain of camera 110, a region of interest of camera 110, a focus of camera 110, a zoom of camera 110, a white balance of camera 110, a resolution of camera 110, a cropping of an image from camera 110, a per pixel bit depth of camera 110, and/or other camera setting as would be appreciated. In some implementations of the invention, settings adjuster 220 changes camera settings 155 from a first set of camera settings 155 to a second set of camera settings 155 based on the presence, location, and/or extent of the face in image 135.

In some implementations of the invention, face recognizer 240 receives the location and/or extent of the face in image 135 and determines a likelihood that the face will be recognized. In some implementations of the invention, face recognizer 240 determines a quality metric (e.g., a color histogram, a sharpness, a feature strength, an image quality, etc.) or other objective measurement of an image quality of the face in image 135. If face recognizer 240 determines, based on the quality metric, that the image quality of the face in image 135 is insufficient for facial recognition, face recognizer 240 instructs settings adjuster 220 to provide a new set of camera settings 155 to camera 110.

In some implementations of the invention, if face recognizer 240 determines, based on the quality metric, that the image quality of the face in image 135 is sufficient for facial recognition, face recognizer 240 instructs face acquirer 250 to capture or otherwise acquire another image 135 of the face. In some implementations of the invention, face acquirer 250 causes camera 110 to capture a high resolution two-dimensional image of the face using the latest set of camera settings 155. In some implementations of the invention, face acquirer 250 causes a lidar system to scan and capture a three-dimensional image of the face (i.e., a collection of motion-compensated, three-dimensional measurements of the face). In some implementations of the invention, face acquirer 250 causes camera 110 to capture a high resolution two-dimensional image of the face using the latest set of camera settings 155 and causes the lidar system to scan and capture a three-dimensional image of the face. In some implementations of the invention, due to time associated with capturing the three-dimensional image, face acquirer 250 instructs settings adjuster 220 to continuously adjust camera settings 155 for camera 110, as necessary to compensate for changes that may occur during this time, while capturing the three-dimensional image.

In some implementation of the invention, windshield detector 230 receives image 135 and detects a windshield, or other window, in image 135 using various image processing techniques as would be appreciated. By way of example, a rectangular region of an appropriate size may be detected in image 135 using for example a Hough transform as would be appreciated. Also by way of example, windshields may be detected via machine learning techniques by training on images that include windshields as would be appreciated. In some implementations of the invention, windshield detector 230 detects a windshield or other window or transparent surface in accordance with techniques described in co-pending U.S. patent application Ser. No. 14/732,656, entitled "System and Method for Determining Ranges to a Target Behind a Transparent Surface," and filed on even date herewith, which is incorporated herein by reference in its entirety.

In some implementations of the invention, windshield detector 230 outputs confirmation of a presence of a windshield in image 135. In some implementations of the invention, windshield detector 230 outputs a relative location of the windshield in image 135. In some implementations of the invention, windshield detector 230 outputs a relative location and an extent of the windshield in image 135. In some implementations of the invention, windshield detector 230 outputs a relative location, an extent, and a range of the windshield in image 135.

In some implementations of the invention, based on the presence, location, and/or extent of the windshield in image 135, settings adjuster 220 adjusts various camera settings 155 of camera 110. Once a windshield is detected, face recognizer 250 may determine an expected location of a face behind the windshield and settings adjuster 220 may adjust various camera settings 155 for that expected location and to account for the face being behind a windshield and hence, within a poorly or non-uniformly, lit vehicle.

Figure 3:
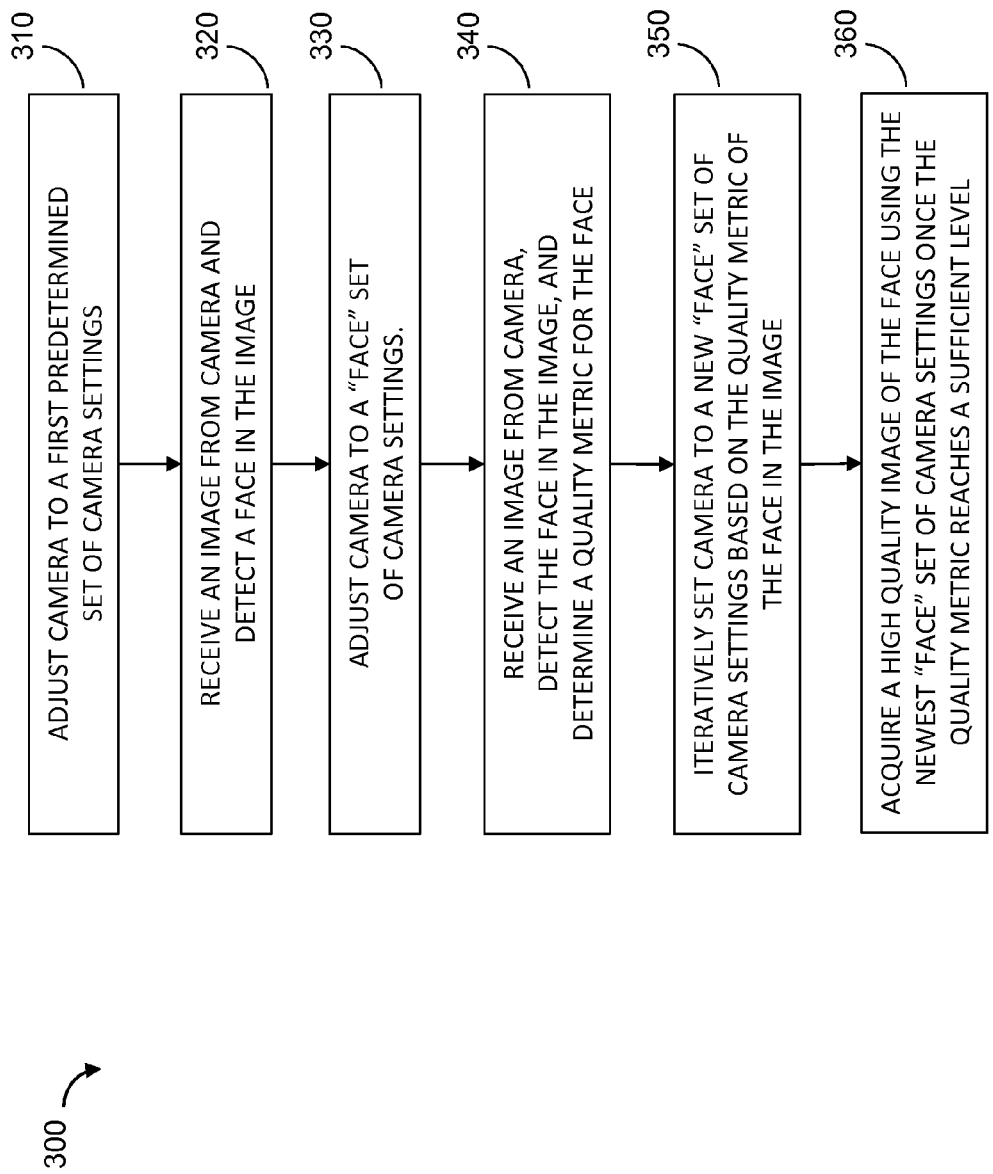
FIG. 3 illustrates an operation of image processing system according to various implementations of the invention.

FIG. 3 illustrates an operation 300 of image processor 120 in accordance with various implementations of the invention. In an operation 310, settings adjuster 220 adjusts camera settings 155 to a predetermined set of camera settings. The predetermined set of camera settings are optimized to provide a predetermined image quality of a full frame of camera 110 or some relevant portion thereof (i.e., some portions of the frame of camera 110 may simply not matter). Such camera settings 155 may be optimized based on application, environment, time of day, or other factors as would be appreciated.

In some implementations of the invention, settings adjuster 220 may iteratively adjust camera settings 155 through a number of predetermined sets of camera settings, each set tuned to a different one of various scenarios that might exist in the uncontrolled environment. These different predetermined sets ensure that a face in the uncontrolled environment is detected by one of the predetermined sets when the face might not be detected by another one of the predetermined sets. Iterating through different predetermined sets of camera settings in accordance with various implementations of the invention permits image processing system 100 to search for faces in the entire frame.

In an operation 320, face detector 210 receives an image 135 from camera 110, which is set to one of the predetermined set of camera settings, and detects a face in image 135. Face detector 210 provides information regarding the detected face to settings adjuster 220. In an operation 330, settings adjuster 220 adjusts camera settings 155 to a "face" set of camera settings. The "face" set of camera settings are optimized to provide a predetermined image quality of the face in image 135. In some implementations of the invention, the "face" set of camera settings may include a region of interest which may be set to the detected face in image 135.

In an operation 340, face recognizer 240 receives an image 135 from camera 110, which is set to a "face" set of camera settings, detects the face, and determines a quality metric of the face in image 135, the quality metric indicative of an image quality of the face in image 135. In an operation 350, settings adjuster 220 iteratively sets camera 110 to a new "face" set of camera settings based on the image quality of the face in image 135. In an operation 360, face acquirer 250 causes camera 110 to acquire a high quality image of the face using the newest "face" set of camera settings once the quality metric achieves a sufficient level. In some implementations of the invention, settings adjuster 220 continues to adjust camera settings 155 while camera 110 acquires the high quality image of the face.

In a first optional operation (not otherwise illustrated in FIG. 3), windshield detector 230 detects a windshield in the scene. As discussed above, windshield detector 230 may detect such a windshield in image 135 from camera 110 or may detect such a windshield based on measurements from a lidar. Windshield detector 210 provides information regarding the detected windshield to settings adjuster 220. In a second optional operation (also not illustrated in FIG. 3), settings adjuster 220 adjusts camera settings 155 to a "windshield" set of camera settings. In some implementations of the invention, the "windshield" set of camera settings are optimized to provide a predetermined image quality of the windshield in image 135. In some implementations of the invention, the "windshield" set of camera settings are optimized to provide a predetermined image quality of a potential face behind windshield in image 135. In some implementations of the invention, the "windshield" set of camera settings may include a region of interest which may be set to the detected windshield in image 135. In some implementations of the invention, operation 300 continues with face detector 210 receiving an image 135 from camera 110, which is set to a "windshield" set of camera settings, and detecting a face in image 135.

According to various implementations of the invention, each of the sets of camera settings (e.g., predetermined sets, "face" sets, "windshield" sets, etc.) may be determined based on various training scenarios to optimize performance of image processing system 100 in each of the various stages as would be appreciated. Performance of image processing system 100 may be optimized using various cost functions and learning/training algorithms, such as, but not limited to, Markov processes, convolution and pooling neural networks, genetic algorithms, and vector machine training as would be appreciated.

Various implementations of the invention provide an optimal set of camera settings at the onset of (and in some implementations during) acquisition of a high quality image, such as a three-dimensional image of the face acquired by, for example, the lidar system. In some implementations of the invention, acquisition of the high quality image may take significant time relative to a frame rate of camera 110. For example, the three-dimensional image of the face may take 1.5 seconds or more to acquire, whereas the frame rate of camera 110 may be 30 frames per second (fps). Having the optimal set of camera settings at the onset and having those camera settings updated during acquisition of the high quality image facilitates achieving optimal performance.

Various implementations of the invention facilitate detection of face(s) in image(s) 135 in a variety of conditions, including differing lighting conditions. Further, camera settings 155 can be adjusted and optimized for each face in image 135. In some implementations of the invention, a first set of camera settings 155 may be optimized for a first face in the uncontrolled environment and then a first image 135 (not necessarily a "high quality" one) may be captured.

Next, a second set of camera settings 155 may be optimized for a second face in the uncontrolled environment and then a second image 135 may be captured. This may continue until all faces in the uncontrolled environment are captured. Once all the faces are captured, face acquirer 350 may revisit each face and acquire a high quality image of each face. In these implementations, optimized images of each face may be captured and then high quality images of some of the faces (due to time constraints of the targets moving in the scene) may be acquired.

In some implementations of the invention, once a face is detected in image frames 135, a trajectory of the face is estimated in an effort to predict its expected location in subsequent image frames. Techniques for estimating motion of a target (i.e., a trajectory) in an image stream are well known. In such implementations, settings adjuster 220 may adjust camera settings 155 based on the expected location of the face in each subsequent image frame 135. Such implementations are particularly useful in environments when illumination of the face changes as the target moves in the scene.

While the invention has been described herein in terms of various implementations, it is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for controlling camera settings of a camera, the method comprising:
   receiving a first image from the camera, the first image captured by the camera at a first set of camera settings;
   detecting a face in the first image;
   adjusting the camera to a second set of camera settings based on the detected face, the second set of camera settings different from the first set of camera settings;
   receiving a second image from the camera, the second image captured by the camera at the second set of camera settings;
   detecting the face in the second image;
   determining a quality metric of the face in the second image, the quality metric indicative of an image quality of the face in the second image;
   adjusting the camera to a new set of camera settings to increase the quality metric of the face in new images, the new set of camera settings different from both the first set of camera settings and the second set of camera settings; and
   acquiring the face upon reaching a sufficient quality metric of the face.

2. The method of claim 1, wherein each of the sets of camera settings comprises an aperture, an exposure, and a gain.

3. The method of claim 1, further comprising:
   detecting a windshield in an image; and
   changing a region of interest of the camera based on the detected windshield.

4. The method of claim 3, further comprising adjusting the camera to a new set of camera settings based on the detected windshield.

5. The method of claim 3, wherein changing the region of interest of the camera comprises changing the region of interest from a full frame region of interest to a windshield region of interest.

6. The method of claim 1, further comprising changing a region of interest of the camera in response to detecting a face in the first image.

7. The method of claim 6, wherein changing the region of interest of the camera in response to detecting a face in the first image comprises changing the region of interest from a full frame region of interest to a facial region of interest.

8. The method of claim 1, further comprising, before receiving the first image from the camera:
   iteratively adjusting the camera through a number of sets of camera settings, each set of camera settings tuned to a different one of various scenarios that might exist in the uncontrolled environment.

9. The method of claim 1, wherein acquiring the face upon reaching a sufficient quality metric of the face comprises acquiring a three-dimensional image of the face.

10. A method for controlling camera settings of a camera, the method comprising: receiving a first image from the camera, the first image captured by the camera at a first set of camera settings; detecting a first event in the first image; adjusting the camera to a second set of camera settings based on the detected event, the second set of camera settings different from the first set of camera settings; receiving a second image from the camera, the second image captured by the camera at the second set of camera settings; detecting a second event in the second image; determining a quality metric associated with the second event in the second image, the quality metric indicative of a quality of the second event in the second image; adjusting the camera to a new set of camera settings to increase the quality metric in new images, the new set of camera settings different from both the first set of camera settings and the second set of camera settings; and a face acquirer configured to acquire the face upon reaching a sufficient quality metric of the face; and acquiring a new image captured by the camera at the new set of camera settings when a sufficient quality metric in the new image is reached.

11. A system for controlling camera settings of a camera comprising:
   a face detector configured to receive a first image from the camera, the first image captured by the camera at a first set of camera settings, and configured to detect a face in the first image;
   a settings adjuster responsive to the face detector and configured to adjust the camera to a second set of camera settings based on the detected face, the second set of camera settings different from the first set of camera settings,
   wherein the face detector is further configured to receive a second image from the camera, the second image captured by the camera at the second set of camera settings, and further configured to detect the face in the second image; and
   a face recognizer configured to determine a quality metric of the face in the second image, the quality metric indicative of an image quality of the face in the second image,
   wherein the settings adjuster is further configured to adjust the camera to a new set of camera settings to increase the quality metric of the face in new images, the new set of camera settings different from both the first set of camera settings and the second set of camera settings; and
   a face acquirer configured to acquire the face upon reaching a sufficient quality metric of the face.

12. The system of claim 11, wherein the settings adjuster is further configured to iteratively adjust the camera to new sets of camera settings while the face acquirer acquires the face.

13. The system of claim 11, wherein each of the sets of camera settings comprises an aperture, an exposure, and a gain.

14. The system of claim 11, wherein the face detector is further configured to detect a windshield in the first image and change a region of interest of the camera based on the detected windshield.

15. The system of claim 14, wherein the settings adjuster is further configured to adjust the camera to a new set of camera settings based on the detected windshield.

16. The system of claim 14, wherein changing the region of interest of the camera comprises changing the region of interest from a full frame region of interest to a windshield region of interest.

17. The system of claim 11, wherein the face detector is further configured to iteratively adjust the camera through a number of predetermined sets of camera settings until a face is detected in an image, each set of camera settings tuned to a different one of various scenarios that might exist in the uncontrolled environment.

\* \* \* \* \*